United States Patent [19]

Hall

[11] Patent Number: 4,948,371
[45] Date of Patent: Aug. 14, 1990

[54] SYSTEM FOR TRAINING AND EVALUATION OF SECURITY PERSONNEL IN USE OF FIREARMS

[75] Inventor: Howard F. Hall, Albuquerque, N. Mex.

[73] Assignee: The United States of America as represented by the United States Department of Energy, Washington, D.C.

[21] Appl. No.: 343,988

[22] Filed: Apr. 25, 1989

[51] Int. Cl.$^5$ .............................................. F41C 3/00
[52] U.S. Cl. ...................................... 434/21; 434/23; 434/219; 273/311; 273/312; 364/410
[58] Field of Search .............................. 434/11, 20–23, 434/219; 273/310–316, 371; 364/410; 358/104, 342, 904

[56] References Cited

U.S. PATENT DOCUMENTS

| | | | |
|---|---|---|---|
| 3,104,478 | 9/1963 | Strauss et al. | 273/310 X |
| 3,798,795 | 3/1974 | Michelson . | |
| 3,802,098 | 4/1974 | Sampson et al. . | |
| 3,802,099 | 4/1974 | Mell et al. | 434/20 |
| 3,811,204 | 5/1974 | Marshall et al. . | |
| 3,849,910 | 11/1974 | Greenly . | |
| 3,911,599 | 10/1975 | Talley . | |
| 3,960,380 | 6/1976 | Yokoi | 273/311 |
| 4,102,532 | 7/1978 | Van Jepmond et al. | 273/311 X |
| 4,164,081 | 8/1979 | Berke | 434/22 |
| 4,223,454 | 9/1980 | Mohon et al. | 434/22 X |
| 4,395,045 | 7/1983 | Baer | 434/22 X |
| 4,695,058 | 9/1987 | Carter et al. | 434/22 X |
| 4,720,789 | 1/1988 | Hector et al. | 364/410 |
| 4,751,642 | 6/1988 | Silva et al. | 364/410 X |
| 4,752,226 | 6/1988 | Akers et al. | 434/11 |
| 4,772,028 | 9/1988 | Rockhold et al. | 434/22 X |
| 4,844,476 | 7/1989 | Becker | 434/22 X |

OTHER PUBLICATIONS

"Miles (Multiple Integrated Laser Engagement System) Field Operation and Maintenance", SAND81-0236, Bishop, Sandia National Laboratories, 1981.

Primary Examiner—Richard J. Apley
Assistant Examiner—J. L. Doyle
Attorney, Agent, or Firm—L. E. Carnahan; Roger S. Gaither; William R. Moser

[57] ABSTRACT

An interactive video display system comprising a laser disc player with a remote large-screen projector to view life-size video scenarios and a control computer. A video disc has at least one basic scenario and one or more branches of the basic scenario with one or more subbranches from any one or more of the branches and further subbranches, if desired, to any level of programming desired. The control computer is programmed for interactive control of the branching, and control of other effects that enhance the scenario, in response to detection of when the trainee has (1) drawn an infrared laser handgun from his holster, (2) fired his laser handgun, (3) taken cover, (4) advanced or retreated from the adversary on the screen, and (5) when the adversary has fired his gun at the trainee.

9 Claims, 8 Drawing Sheets

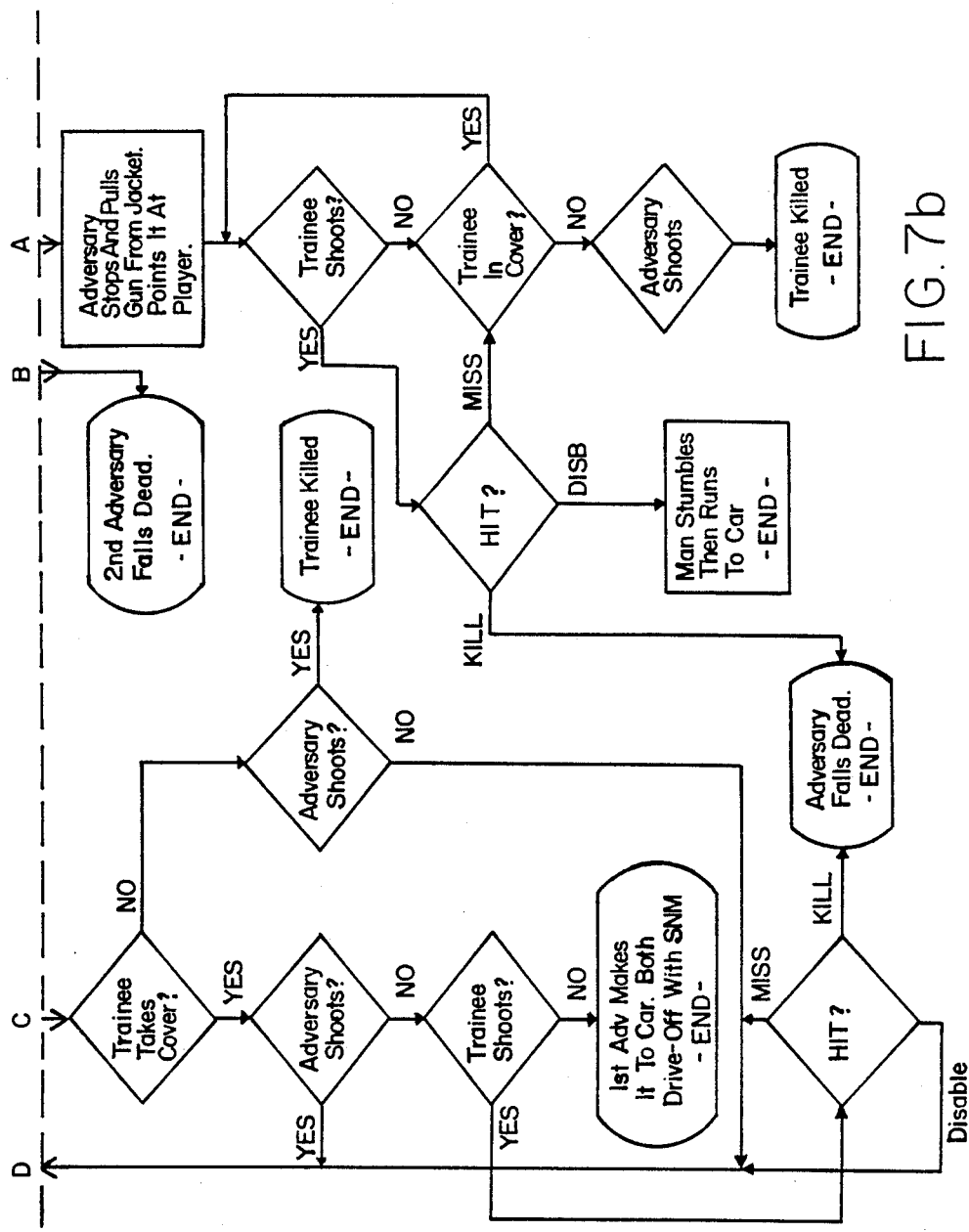

SYSTEM FOR TRAINING AND EVALUATION OF SECURITY PERSONNEL IN USE OF FIREARMS

BACKGROUND OF THE INVENTION

The invention described herein arose in the course of, or under, Contract No. DE-08-88NV10617 between the United States Department of Energy and the University of California.

The invention relates to an interactive video system programmed to provide realistic training for and evaluation of security personnel who may have occasion to use firearms under prescribed security procedures.

There is a continuing emphasis within the Department of Energy and the general community of security-force services on providing ongoing training and evaluation of personnel in the use of firearms in carrying out correct security procedures in situations which (1) require recognition of life-threatening situation, (2) rapid decision-making and execution of deadly force, and (3) instantaneous reaction for self-protection. While security procedures may be readily taught from manuals in classroom environments, realistic training and evaluation is necessary in life-like scenarios to train and test the judgement and reflexes of personnel as they carry out security procedures.

SUMMARY OF THE INVENTION

An object of this invention is to provide an interactive video projection system for training of security personnel in policies and procedures in the use of a handgun under realistic adversary life-threatening and security-breaching scenarios.

Another object is to provide for the detection of when the trainee has removed his handgun from a holster in order for the interactive system to be able to determine when to branch in the scenario being projected.

Another object is to provide for detection of when the trainee takes cover, advances or retreats from the adversary, in order for the interactive system to be able to determine when to branch in the scenario.

A further object is to provide for the detection of shots when a trainee shoots at the adversary in a scenario being projected on a screen, in order for the interactive system to determine when to have the interactive system branch in the scenario that is being projected.

Yet another object is to provide for the detection of when an adversary in a scenario shoots back in order for the interactive system to be able to determine when to branch in the scenario.

Still another object is to provide for synthesizing the sound of a handgun being fired by the trainee, and to project realistic sound of the shot through speakers.

These and other objects of the invention are achieved by an interactive video display system comprising a laser disc player with a remote large-screen projector to view life-size video scenarios and a control computer. A video disc has at least one basic scenario and one or more branches of the basic scenario with one or more subbranches from any one or more of the branches and further subbranches, if desired, to any level of programming desired. The control computer is programmed for interactive control of the branching, and control of other effects that enhance the scenario, in response to detection of when the trainee has (1) drawn an infrared laser handgun from his holster, (2) fired his laser handgun, (3) taken cover, (4) advanced or retreated from the adversary on the screen, and (5) when the adversary has fired his gun at the trainee. When the trainee fires his laser handgun, an infrared television camera focused on the projection screen detects an IR dot on the screen. A coordinate computer continually receives sync signals and clock pulses from the laser disc player to continually determine scan coordinates for the control computer while the control computer continually receives the frame location address. The control processor notes both at the time a hit is detected and then proceeds to compare the IR dot coordinates with predetermined hit-zone coordinates to determine whether or not the adversary has been hit in any one of a plurality of predetermined hit zones. If the laser dot falls within a programmed hit zone, a hit is recorded, and the control computer effects a programmed branch which may be one of several depending upon the zone hit. Otherwise a miss is recorded. When an IR dot on the screen is detected, the coordinate computer controls the projection of a shot sound. When the adversary shoots back, the coordinate computer detects that event in the frame being projected and determines that a programmed branch in the scenario being projected has been reached. At the same time, the control computer triggers a light-emitting diode (LED) positioned over the center of the screen. A vest with photosensors worn by the trainee detects the LED pulse and signals to the control computer that the trainee has been hit if he has not taken cover. The control computer then initiates a programmed branch. A treadle sensor behind the cover which the trainee may take signals to a microprocessor and vest electronics to signal to the control computer that the trainee is behind cover. A second treadle in front of the trainee's position at the start of the training scenario signals to the microprocessor and vest sensor electronics when the trainee has advanced onto it, and when the trainee has retreated off of it. All of these signals (shot back, cover, advance/retreat as well as handgun unholstered) are transmitted by the microprocessor and vest sensor electronics to the control computer.

The main training scenario, and all of its branches and subbranches, are enacted, edited and stored on video disc. The control computer continually monitors the frame address (number) and controls the branches according to the data received from the shot coordinate microprocessor and the microprocessor and vest sensor electronics. When a scene is reached in which the adversary shoots back, the address of the first frame is noted at the time of editing and entered in the operating program of the control computer which then triggers the shootback LED. Although the editing procedure requires review of every segment of what is recorded on the video disc, the trainee will see only the main scenario and the conditional branches that are programmed into the operating program of the control computer.

The novel features that are considered characteristic of this invention are set forth with particularity in the appended claims. The invention will best be understood from the following description when read in connection with the accompanying drawings.

BRIEF DESCRIPTION OF THE DRAWINGS

FIGS. 7a and 7b illustrate a typical flow chart for an operating program to be used in the control computer of FIG. 2.

DETAILED DESCRIPTION OF THE INVENTION

Figure 1:
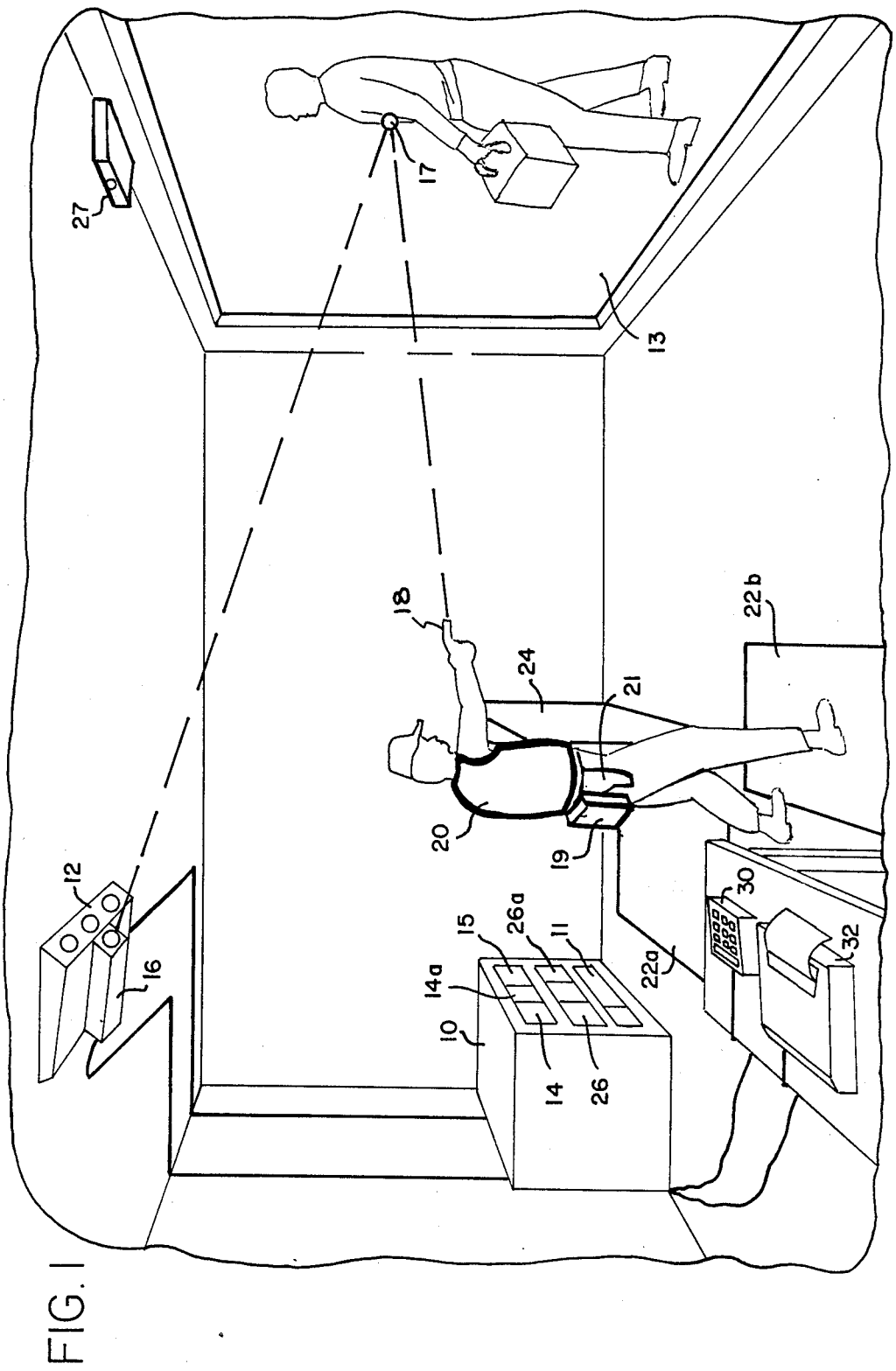
FIG. 1, illustrates in a perspective view components of an interactive television system for providing realistic training and evaluation of security personnel in the use of firearms in accordance with the present invention.
Figure 2:
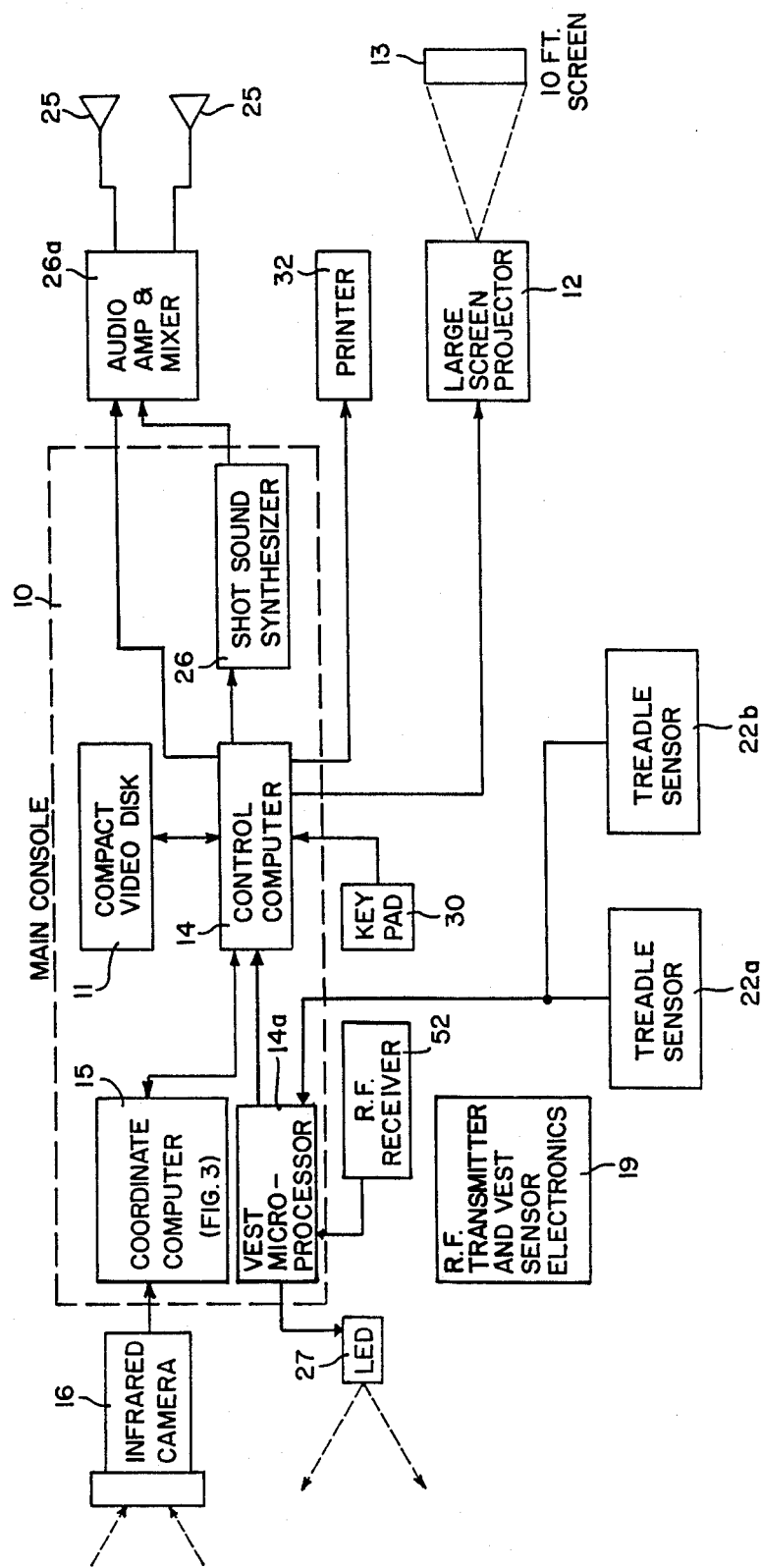
FIG. 2 illustrates a block diagram of the components in the system of FIG. 1.

Referring to FIGS. 1 and 2, an interactive video system for training and evaluation of security personnel is comprised of a main console 10 for housing a compact video disc player 11 and electronic circuitry for driving a remote large-screen color television projector 12 for viewing life-size video scenes on a 10'-diagonal screen 13. The main console 10 also a control computer 14, a dedicated coordinate computer 15 connected to an infrared television camera 16 for detecting an infrared (IR) dot 17 (FIG. 1) on the screen 13 when a trainee fires a laser gun 18 (FIG. 1) that directs an IR beam toward a target in a scene being displayed, and a microprocessor 14a and vest sensor electronics 19 for processing data received from an IR sensor on a vest 20 (FIG. 1) and a microswitch in a holster 21 (FIG. 1) worn by a trainee. The microprocessor 14a also receives signals from treadle sensors 22a and 22b placed relative to the screen 13 and an object 24 (such as a 4-foot wall). The vest electronics 19 transmits information to the control computer 14 through suitable channels, such as the microprocessor 14a and vest sensor electronics 19. The object 24 is positioned in the projection room to provide the trainee something behind which he may take cover at any time the trainee believes an adversary on the screen may threaten to shoot back.

Dual speakers 25 (FIG. 2) provide sound from a shot sound synthesizer 26 and amplifier 26a (FIG. 2) that is activated each time an IR dot 17 on the screen 13 is sensed through the IR television camera 16. If the adversary in the scenario being displayed on the screen 13 shoots back, the main control computer decodes the address of the first frame of the shot back and triggers an IR light emitting diode 27 positioned over the screen, as shown in FIG. 1. If the trainee has not taken cover behind the object 24, a photodetector on the vest 20 worn by the trainee will detect the "shot back." The vest sensor electronics 19 worn by the trainee has an encoder and low power radio transmitter that transmits a delta modulated signal on which there is encoded information as to when a "shot back" has been detected, and when a holster microswitch has been closed, i.e., the handgun 18 has been withdrawn from the holster 21.

While the system is programmed for interactive control through the main control computer 14, as will be described more fully hereinafter, a keypad 30 is provided to allow a training supervisor to select a scenario, and to override the control program in selecting branches in the scenario. A printer 32 is provided to print a record of the training exercise, such as the number of shots fired by the trainee, the number of hits, the scenario branch being played at the time the trainee is hit, etc.

Figure 3:
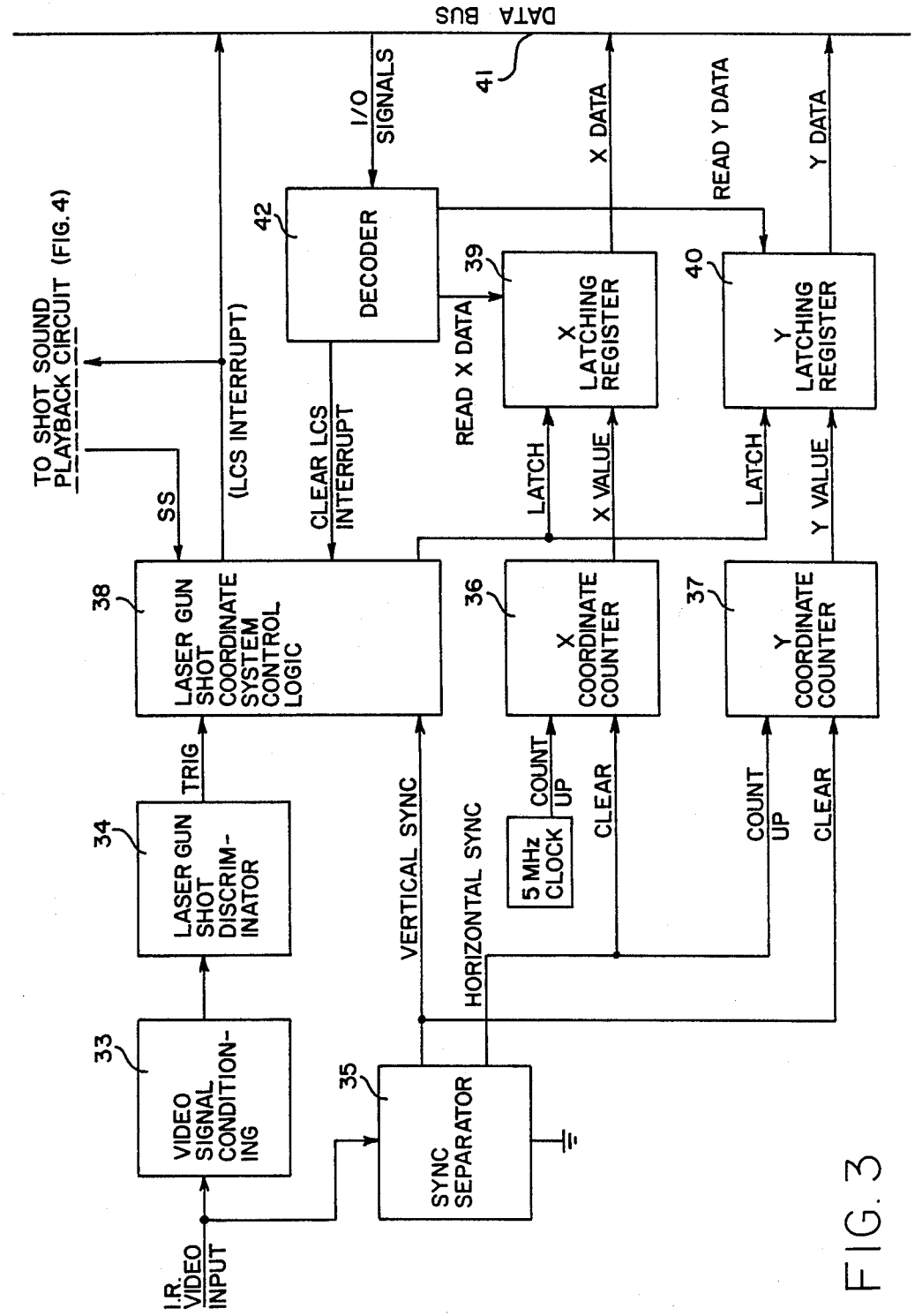
FIG. 3 is a block diagram of the coordinate computer of FIG. 2.

Referring next to FIG. 3, the coordinate computer 15 receives an IR video input from the infrared camera 16 (FIG. 1) upon detecting the infrared dot 17 produced momentarily by firing the IR laser gun 18. A video signal conditioning circuit 33 will suppress the video input signal that is below a predetermined level of amplitude expected from an IR dot, and a circuit 34 discriminates a laser gun shot by detecting an IR signal of the expected amplitude for predetermined duration, thus discriminating a laser gun shot image on the basis of a minimum IR dot diameter.

The composite video input from the IR video camera 16 (FIG. 1) is also applied to a sync separator 35 which transmits vertical and horizontal sync pulses to X and Y coordinate counters 36 and 37, respectively. Vertical sync pulses are also transmitted to a laser gun shot coordinate system control logic 38. The Y coordinate counter 37 provides the Y value (line count) for an X-Y coordinate system of defining the position of the laser dot 17 on the screen. The X coordinate counter 36 counts 5 MHz clock pulses and is cleared by each horizontal sync pulse to begin counting up again at the start of each raster scan of the IR video input.

When an laser gun shot is detected by the discriminator 34 following a vertical sync pulse, a trigger pulse TRIG is produced in response to which the control logic 38 issues a LATCH signal that causes X and Y latching registers 39 and 40 to store the contents of the respective X and Y coordinate counters 36 and 37. X and Y data on the position of the laser gun shot received at the screen is thus made available through a data bus 41 to the control computer 14 (FIG. 2). At the same time, an LCS interrupt signal is transmitted over the bus to signal to the control computer 14 that the trainee has fired the laser gun. The control computer is interrupted in its operation to read the X and Y coordinate data from the bus and, in response to the LCS interrupt, issues an I/O signal to a decoder 42 to (1) cause the X and Y data to be read out of the latching registers and into the control computer via the bus, and (2) clear the LCS interrupt from the laser gun shot coordinate control logic 38.

Figure 4:
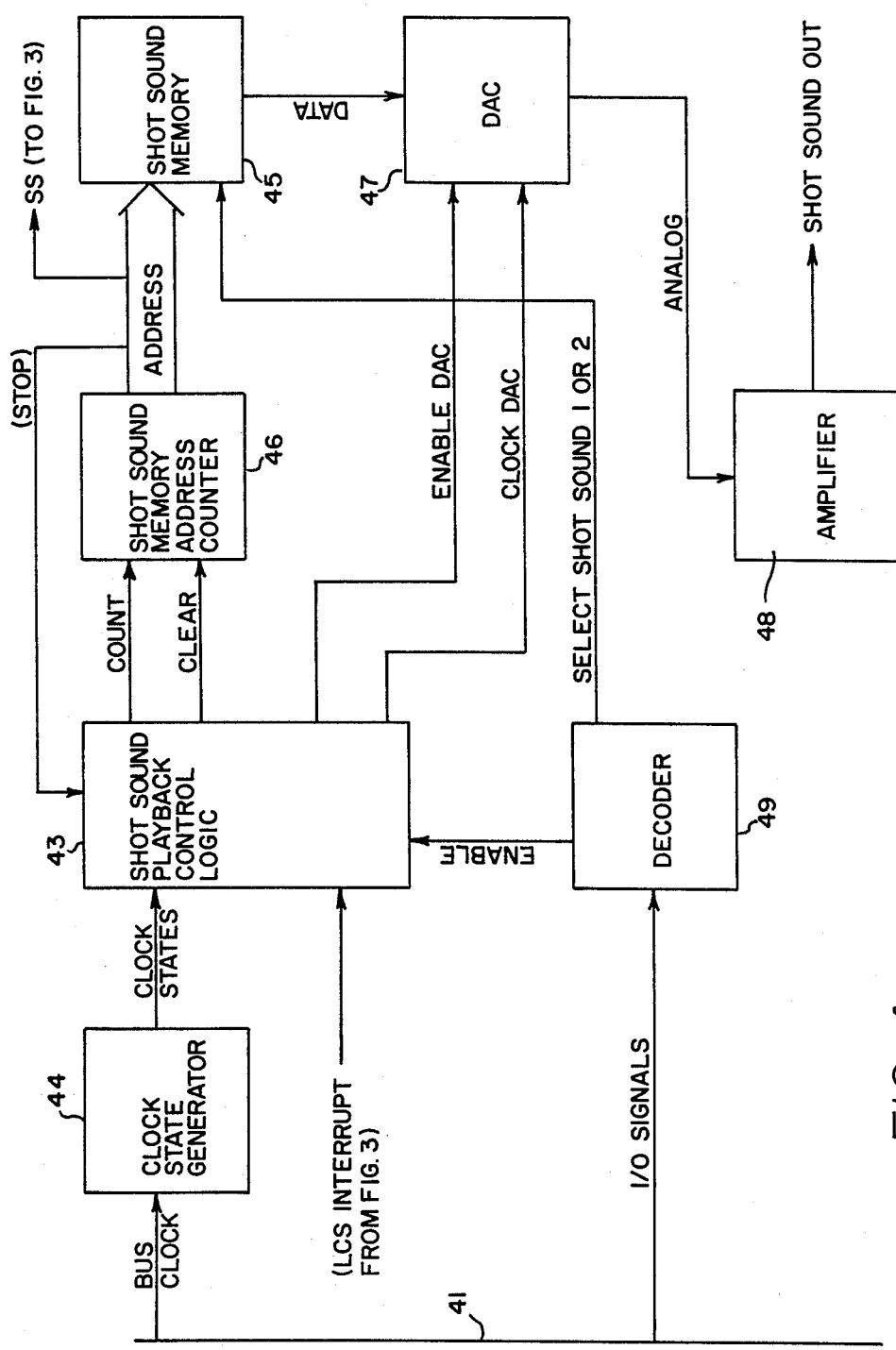
FIG. 4 is a block diagram of the shot sound synthesizer of FIG. 2.

The LCS interrupt signal is also transmitted from the laser control logic 38 to a shot sound playback circuit shown in FIG. 4 where a shot sound playback control logic 43 is enabled to playback the sound of a gunshot in response to the next sequence of a clock state generator 44 implemented with a binary counter that continually recycles as it counts clock pulses being distributed by the control computer 14 via the system bus 41. The shot sound playback control logic 43 causes a shot sound to be transmitted to speakers 25 (FIG. 2) with the next sequence of clock states following an LCS interrupt signal.

A shot sound is stored in a digital memory 45 which is addressed by a shot sound memory address counter 46. As the control logic 43 receives successive clock states, it generates count pulses that increment the address counter 46. Shot sound data read from the memory 45 are converted from digital to analog form by a digital-to-analog converter (DAC) 47. The analog output is amplified by an amplifier 48 which drives the speakers 25 (FIG. 2). The control logic 43 enables the DAC to start converting in response to clock pulses generated by the control logic 43 from the clock states.

Once the memory address counter has completed one full cycle, it signals to the shot sound control logic 43 to stop shot sound. It also transmits a shot sound signal SS to the laser gun shot coordinate system control logic 38 to confirm that a gunshot sound has been generated over a period greater than the presence of an IR spot 17 on the screen 13 in FIG. 1, thereby enabling the control logic 38 to initiate another gunshot detection and sound sequence should another IR spot appear on the screen 13. This assures that there will not be double shot sound for just one laser gunshot, but will allow for successive shot sounds if the laser gun is fired repeatedly.

In order to provide a different shot sound for two different types of gun that may be used by the trainee, two separate shot sounds may be stored in different memory blocks of the shot sound memory 45. The selection is made by a decoder 49 which decodes an I/O signal code from the control computer 14 initiated upon receiving an LCS interrupt signal from the control logic 38 (FIG. 3). The control computer stores the gun type identification code manually entered at the keypad 30 (FIG. 1). The decoder 49 also generates an enable signal for the shot sound playback control logic.

The role of the microprocessor 14a and vest sensor electronics 19 (FIG. 2) will now be described with reference to FIG. 5. When a scenario being displayed reaches a scene in which an adversary shoots at the player, the control computer 14 reads the frame number of the scene from the video disc 11 and issues a "shoot-back" command as an I/O signal on the bus 41 shown in the block diagrams of FIGS. 3, 4 and 5. An instruction decoder 50 shown in FIG. 5 receives this command and sends a pulse to an amplifier 27a for the infrared shoot-back emitter diode 27 mounted above the projection screen 13 (FIG. 1). The vest 20 (FIG. 1) worn by the trainee has mounted upon it one or more infrared sensors 20a. If any one of the sensors is exposed to IR radiation when the emitter diode 27 is pulsed, an amplifier 19b sends a signal to an encoder, delta modulator and RF transmitter 19c. A microswitch 21a mounted in the trainee's holster 21 (FIG. 1) also produces a signal in the encoder 19c to indicate when the trainee's gun is drawn out of the holster. The switch 21a is normally open, as shown, and is closed when the gun is drawn out of the holster to provide a voltage signal from a bias source. Both signals to the vest encoder 19c are encoded and delta modulated in sequence for RF transmission through an antenna 20b to an antenna 51 of the RF receiver 52. The components 19b and 19c are mounted on the trainee's duty belt while antenna 51 and RF receiver 52 (also shown in FIG. 2) are mounted on the main console 10. The RF transmission channel thus provides communication between the trainee and the main console 10, while the data bus 41 provides a channel between the microprocessor 14a and the control computer 14 (FIG. 2).

The RF signal picked up by the receiver 52 is demodulated by a delta demodulator 53 in the main console 10 and sent to the microprocessor 14a which decodes the information and latches the data in a data register 54. The microprocessor also receives data from treadle sensors 22a and 22b, as well as the microswitch 21a in the gun holster of the trainee to provide additional data which is added to vest data, if any. The microprocessor 14a initiates a vest interrupt signal whenever a change in the composite data occurs. The current vest data is continually stored in the vest data latch 54, where it is available to be read out by a command (I/O signal) from the control computer over the bus 41. The I/O signals include commands to shoot back, read vest data, and clear vest data. The instruction decoder 50 determines not only that the command is intended for this vest data portion of the system, but also which command has been transmitted. A vest interrupt signal is initiated via a gate 56 to the control computer 14 via the bus 41 to indicate that there is vest data waiting to be acted upon whenever there is a change in the vest data. The control computer 14 then reads the vest data and clears the vest interrupt signal it has received with an I/O signal which is decoded by the instruction decoder 50.

Figure 5:
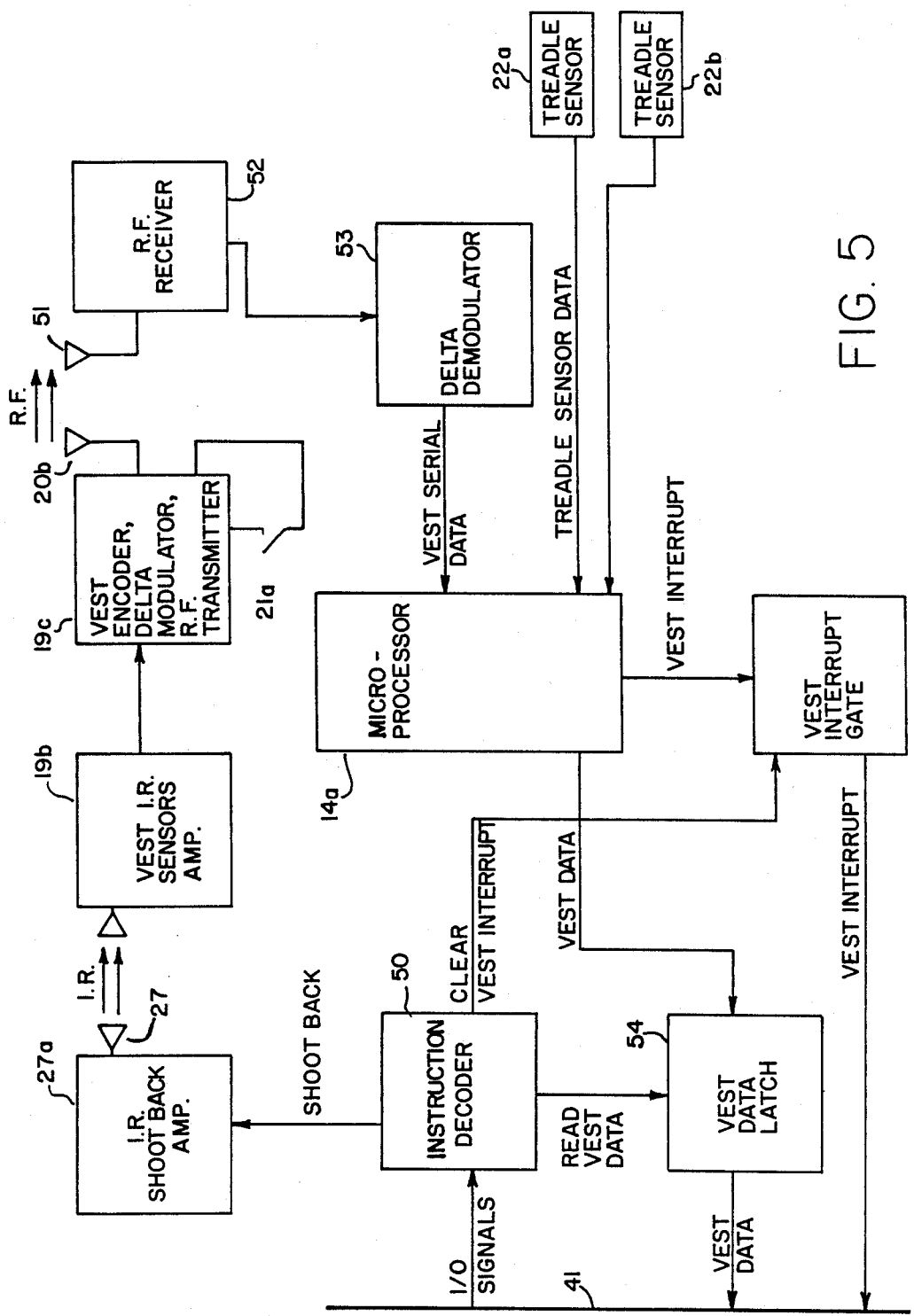
FIG. 5 is a block diagram of the microprocessor and vest sensor electronics of FIG. 2.

From the foregoing description of FIGS. 3, 4 and 5, it is evident that the functions of the system shown in block diagram form in FIG. 2 will carry out the intended interactive video display desired for realistic training of security personnel. As noted hereinbefore, the interactive system shown in FIG. utilizes scenario branching designed to reflect established policies and procedures. The interaction results from the use of a laser gun to shoot at an adversary displayed on the screen, a microswitch to detect when the trainee has drawn his gun from its holster and an infrared camera to detect when and where the adversary on the screen has been hit. Interaction also results from the trainee's position on a treadle 22a (behind cover 24) or a treadle 22b (in the open) whenever the adversary on the screen fires his gun. It is assumed the adversary has perfect aim and will not miss the trainee when he shoots back if the trainee has not taken cover. In addition to this two-way interaction for control of the sequence of scenarios, a training supervisor may override the operating program of the control computer and call up a branch in the flow chart of prepared scenarios to interject new events or otherwise change the course of events displayed on the screen for greater latitude in the training procedure.

In planning the training with life-size scenarios, a script is first prepared with various possible alternatives in the development of the script. Once the script has been enacted with all of its various alternatives using a video camera (not shown), the tape is edited to select the main scenario and to select alternatives to which a branch may be made. These are all placed on the video disc which provides the address of every frame on playback so that the control computer 14 may monitor which frame is being displayed on the screen 13 at all times and to branch to an alternative scenarios. For instance, the scenario being displayed may be of an adversary on the screen fleeing from a building with some contraband of nuclear material carried in one arm. If the established policy is to prevent anyone from leaving that building with contraband, the trainee may be expected to shoot the fleeing person before he rounds a corner of the building. If the trainee misses, nothing changes in the scenario being displayed, but if he does not miss, the scenario may branch to one of two alternative branches, depending upon whether the hit is crippling or fatal. If only crippling, the branch scenario may be of the adversary falling and shooting back. If the trainee has taken cover by the time the adversary shoots, the branch scenario may proceed further, but if the trainee has not taken cover, the scenario may branch again to show the adversary getting back on his feet and fleeing.

In editing and transferring the video tape to the laser disc, the first frame of a shoot-back scene is noted and entered in computer program for the control of branching. As noted hereinbefore, it is assumed the adversary on the screen never misses if he shoots back and the trainee has not taken cover, so when that frame of a shoot-back scene is reached, the computer program not only pulses the IR light emitting diode 27, but also checks to see if the trainee is on the treadle 22a behind the cover object 24; if not and an infrared pulse from the light emitting diode is sensed by a vest IR sensor, the scenario branches.

When the trainee shoots his infrared gun 18 and produces an infrared spot 17 on the screen, the infrared video camera 16 detects the laser gun shot and initiates an LCS interrupt signal to initiate a shot sound (FIG. 4) while the coordinate computer 15 (FIG. 3) determines the X and Y coordinates of the red dot 17 and interrupts the control computer 14, which then issues an I/O signal code to cause the X and Y coordinate data to be read, and to clear the laser gun shot coordinate system. It is the clear LCS interrupt signal that causes the control logic 38 to issue a latch signal to cause the X and Y coordinate data to be stored in registers 39 and 40 for readout. The I/O signals may thus consist of three codewords, a first one detected by a decoder 49 to enable the shot sound playback control logic (FIG. 4), a second one to clear LCS interrupt and a third one to read X and Y data. Note that the shot sound playback control logic will automatically be stopped once the shot sound memory address counter 46 has counted through the addresses necessary for the shot sound memory 45.

Figure 6:
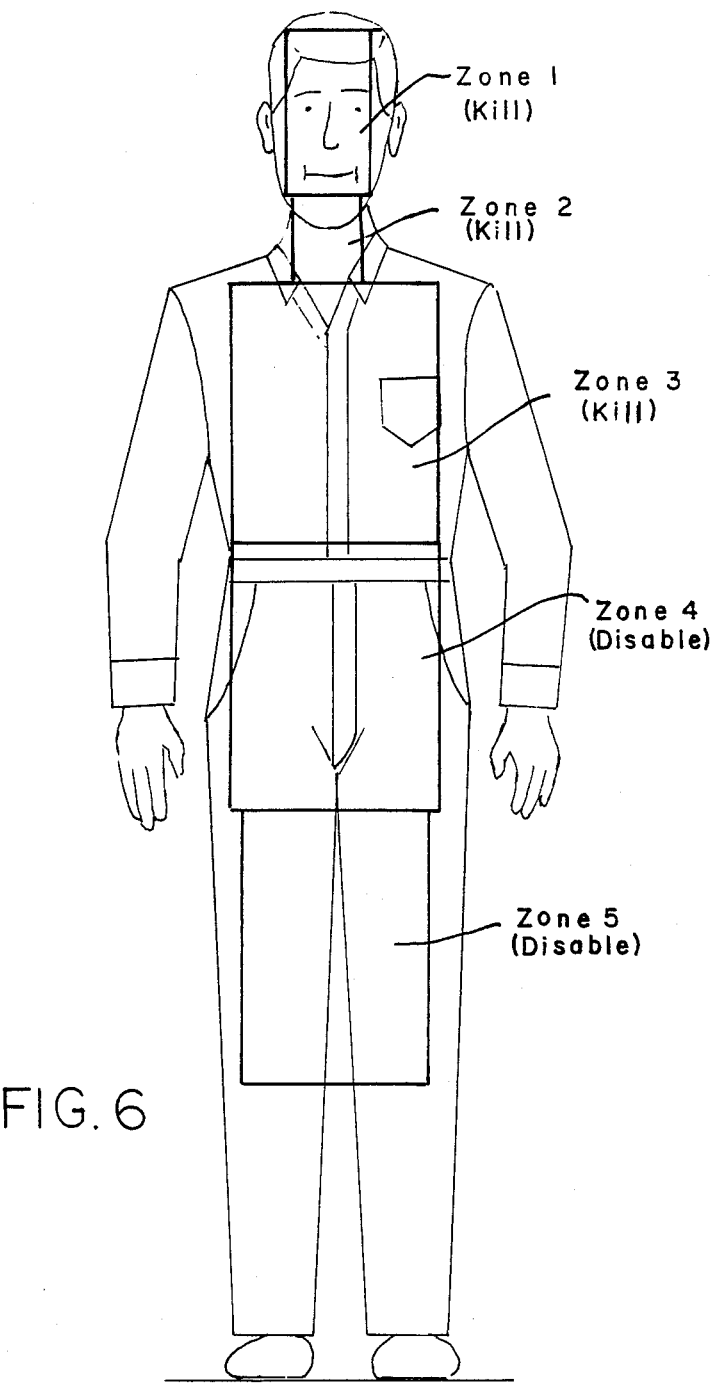
FIG. 6 illustrates programmed hit zones of an adversary in a scene.

When the trainee shoots, the X and Y data from the coordinate computer shown in FIG. 3 is read into the control computer 14 (FIG. 2) in response to the LCS interrupt. The control computer program then checks the X and Y coordinates with hit zone boundaries for the frame, as shown in FIG. 6. These boundaries are predetermined and entered in a table addressed by the program using the frame number. The table consists of X and Y coordinates for the frame. The computer program checks the X and Y data read with the coordinates in the table. If a hit is not found to be within one of the zones defined by the table, the shot is counted as a miss. Otherwise it is counted as a hit. The coordinates in the table may be entered in separate columns, one column from each zone, or with separate flags to distinguish the zones in order that the hits be classified as crippling or fatal. If only crippling in the shoulder, the scenario to which the program branches may be of the adversary dropping the package but continuing to flee, or of the adversary stopping to shoot back with the arm of the other shoulder, but if the coordinates indicate more serious crippling in the chest, the scenario to which the program branches may be of the adversary falling but rolling over to shoot back.

There may be a large number of scenarios compiled for one programmed flow chart of a training sequence, but all may be prepared for branching in a similar way using the laser coordinate system (FIG. 3) with shot sound (FIG. 4) and the microprocessor and vest sensor electronics (FIG. 5) in order that the branching depend upon the trainees interaction with the adversary. What is required to make this possible is the coordinate computer (FIG. 3) for analysis of the trainees firing of his weapon, the microprocessor and the dynamic shot sound playback circuit (FIG. 4) to provide realism, and the vest sensor electronics (FIG. 5) for the scenarios in which the adversary on the screen shoots back. The audio track of the laser disc provides the realism of shots from the screen.

The users in-house capability for producing video discs may be used for developing site-specific scenarios and programming of the control computer 14 shown in FIG. 2. This enables the user with a fast and inexpensive method of programming scenarios for hit zones and threat times to the user's specifications. Once the scenario is set up on video disc, the compact video disc unit provides the frame number of each frame being viewed. Then the scenario being played back may be reviewed scene by scene, and if desired frame by frame. In that manner the user may view a selected scene frame by frame over a period in the scenario that it is anticipated the trainee may fire his gun, and for each frame the hit zones are entered in terms of X and Y coordinates of the frame. These zones are preferably made rectangular as shown in FIG. 6 to facilitate the programming, even though some edges and/or corners of the rectangles may not be on the target. Since the training is not being conducted for marksmanship, a very near miss can be accepted as a hit for purposes of the security training and evaluation system. In the training playback mode, the control computer continually receives frame addresses from the compact video disc, and issues branching instructions to the compact video disc over an address and control (A/C) channel. The compact video disc and control computer are commercially available, such as the Sony 3000 microcomputer designed for control of a Sony video disc.

From the foregoing description, it is evident that the branch control program may provide a number of hit zones for each frame, such as five, and that the hit zones need not all be assigned to the adversary. The hit zones may be assigned to multiple adversaries and even to hostages or bystanders, thus providing for more complex training scenarios with branching that depends upon the person hit.

When considering certain scenes, such as the trainee electing to shoot at an adversary who is holding a hostage, a miss may also be programmed to cause a branch. Branching may also be programmed to depend upon sensing any other action, such as the trainee moving from the treadle 22b to the treadle 22a to take cover. Additional treadles may be added, such as one behind the treadle 22b and beside the treadle 22a, which will allow for detecting when the trainee advances or retreats. All of these possibilities may be used to assemble video scenarios that are a comprehensive composite of various actions of the adversary on the screen and reactions of the trainee. Many scenarios are compiled in an attempt to anticipate all the probable reactions that may be evoked during a training scenario. The concept of the scenario must be decided first. Then the branching decisions must be created based upon the kinds of training and evaluation that the scenario is to provide. Both correct and incorrect decisions must be part of the scenario to reinforce a correct application of policy.

The adversary's dialogue and emotional stress are fundamental components of a training scenario. For example, the adversary may react highly emotionally and with abusive dialogue in reaction to the trainee's actions, such as the trainee taking cover or drawing his gun from the holster, either of which actions may be used to branch to the scene of the adversary using abusive language. A well-designed flow chart, tracking the various branching alternatives is important to the training success. The ease with which a flow chart may be developed, once the scenario concept is decided upon, affords the ability to use the system described without any operator and using only controlled interactive branching, if desired. However, neither the flow chart nor the computer program is an essential element of the system which is regarded as the invention; it is the system that is regarded as the invention. Production of the training scenarios and programming of the branches is to be provided by the using agency based on its security policies with the assistance of video producers, psychologists and computer programmers skilled in the art of, for example, process control. The artistic aspects are important to the success of the training, but it is the system disclosed and described which makes this realistic training with a life-size video display possible. It is therefore the system which is regarded as the invention.

Figure 7A:
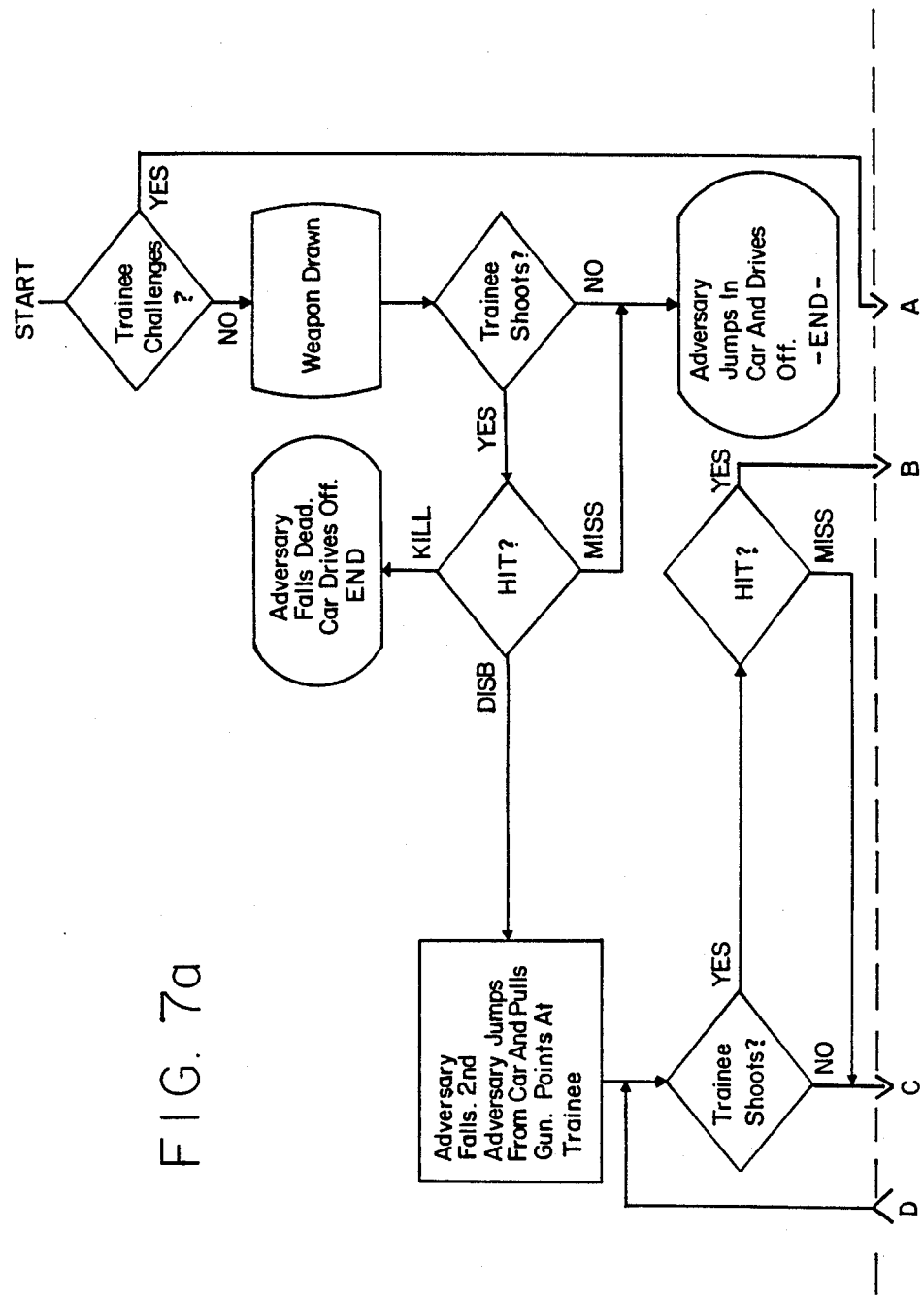

FIGS. 7a and 7b together illustrate a flow chart for a typical scenario with various branches. When the scene opens, the trainee is on the scene outside a building known to contain sensitive nuclear materials, when an intrusion alarm is activated. A man runs out of the building carrying a container. He sees the trainee and runs away toward the corner of the building. The trainee challenges the man and pursues him as he turns the corner. He then sees the man running toward a hole in the fence. A vehicle waits on the other side of the fence. With that as a background, the scenario starts and flows naturally in a self-explanatory way, with numerous decisions made for branching by the control computer starting with the first decision block which determines if the trainee has drawn his weapon. If he has, the flow chart follows one path. The man stops and pulls his gun from inside his jacket and points it at the trainee who then has an opportunity to draw his weapon to shoot, so the question is whether the trainee shoots, if so, the next question is whether he hit the man. If not, the scenario continues, and the man fires his gun. The question then is whether the trainee has taken cover. If not, he is killed and that ends the training scenario, but if he does take cover, the flow chart goes back to the question of whether the trainee did now shoot. If so, and the shot hits a fatal zone, the man falls dead to end the scenario. If only a disabling zone is hit, the man stumbles, then runs for the car and the second adversary. The scenario then jumps to an alternative path A2 reached by the trainee having drawn his weapon at the outset, first and hit the man in a disabling zone. Events then follow the second path.

With this flow chart and the necessary various scenarios recorded, the editing process is carried out by selecting portions of alternate scenes and programming the control computer using frame addresses of the different branches to prepare for the decisions that need be made. The control computer receives the frame numbers and responds to the programming with the proper decisions in a span of frames. The editor must exercise his judgment as to selection of the span, but if conditions are satisfied in that span for a yes decision, a branch will take place; otherwise the scenario last branched to will continue until a branch decision is made, or the scenario ends. The value of the training achieved will depend largely on the skill of planning the flow chart and programming it, a skill that may be regarded as an art. But what makes the planning and programming possible is the system disclosed and defined by the following claims.

What is claimed is:

1. An interactive video projection system for realistic training and evaluation of security personnel armed with a portable infrared laser handgun to be used under prescribed security procedures in life-threatening and security scenarios comprising a laser disc player for reading out recorded video programs of training scenarios and alternate scenarios to which the process of reading out for display may conditionally branch and subbranch to any level of programming desired based upon action of the trainee, including the handling of said laser handgun, a large-screen projector for life-size display of video scenarios being read out of said laser disc player, a control computer programmed for interactive control of branching and subbranching in the readout of said recorded video programs and other effect that enhance the scenario based upon said action of the trainee in handling said laser handgun, including means for detecting when said handgun has been drawn from a holster, means for detecting when said handgun has been fired at an adversary in said scenario, means for detecting whether the trainee has advanced or retreated from said screen, and means for detecting whether the trainee has taken cover whenever an adversary in said scenario fires at the trainee.

2. An interactive video projection system as defined in claim 1 wherein said means for detecting when said handgun has been fired at an adversary in said scenario is comprised of an infrared television camera focused on said screen for detecting an infrared dot on said screen produced by firing said infrared laser handgun.

3. An interactive video projection system as defined in claim 2 including means for computing the X and Y coordinates of said dot detected on said screen based upon vertical and horizontal sync pulses of said infrared video camera and a source of clock pulses by counting horizontal sync pulses which define camera scan rasters to computer the Y coordinate of said dot on said screen as viewed by said infrared camera during each interval between vertical sync pulses which define a frame, and counting clock pulses to compute the X coordinate of said dot on said screen as viewed by said infrared camera during each interval between horizontal sync pulses, means for discriminating a laser dot signal in a video signal from said infrared detector and in response thereto for initiating a latch signal to cause the contents of said X and Y counting means to be latched in latching registers and a laser gun shot interrupt signal to said control computer to cause said computer to read out the contents of said latching registers, and means responsive to said computer reading out said latching registers for clearing said interrupt signal.

4. An interactive video projection system as defined in claim 3 including means for storing a shot sound, and means responsive to said laser gun shot interrupt signal for reading out said shot sound for enhancement of said scenario based upon the trainee firing said laser handgun.

5. An interactive video projection system as defined in claim 4 wherein an adversary in said large screen display shoots back at said trainee, including means for generating a shoot back signal, means for energizing an infrared emitter to produce an infrared flash from a position over said screen in a direction away from said screen, infrared detectors mounted on a vest worn by said trainee to detect said infrared flash, and means for transmitting vest data to said control computer that said trainee has been hit upon an infrared detector on said vest detecting an infrared flash.

6. An interactive video projection system as defined in claim 5 wherein said means for transmitting vest data includes means for initiating a vest interrupt signal upon said vest detecting an infrared flash to said control computer, means for latching said vest data, and means for reading the contents of said vest data latch into said control computer in response to instructions from said computer.

7. An interactive video projection system as defined in claim 6 wherein said means for detecting whether the trainee has taken cover includes at least one treadle behind an object positioned to provide cover to produce treadle data when said trainee has taken cover by stepping on said treadle, and wherein said one treadle data is included in said vest data to produce a vest interrupt signal when it changes state between stepping on and stepping off.

8. An interactive video projection system as defined in claim 7 wherein said means for detecting whether the trainee has advanced or retreated from said screen includes a second treadle beside said object to produce treadle data when said trainee advances toward or retreats from said screen by stepping on or stepping off of said second treadle, and wherein said second treadle data is included in said vest data when it changes state between stepping on and stepping off.

9. An interactive video projection system as defined in claim 8 wherein said means for detecting when said handgun has been drawn from holster by said trainee is comprised of a microswitch and wherein said microswitch data is included in said vest data.

* * * * *

UNITED STATES PATENT AND TRADEMARK OFFICE
CERTIFICATE OF CORRECTION

PATENT NO. : 4,948,371

DATED : August 14, 1990

INVENTOR(S) : Howard F. Hall

It is certified that error appears in the above-identified patent and that said Letters Patent is hereby corrected as shown below:

Col. 1, lines 9 and 10, cancel "the University of California" and insert therefor -- EG&G Energy Measurements, Inc.--.

Signed and Sealed this

Fifth Day of May, 1992

Attest:

DOUGLAS B. COMER

*Attesting Officer*  *Acting Commissioner of Patents and Trademarks*